United States Patent [19]

Morita et al.

[11] 3,935,296

[45] Jan. 27, 1976

[54] METHOD FOR REMOVING SULFUR DIOXIDE FROM A COMBUSTION EXHAUST GAS

[75] Inventors: Tomijiro Morita; Isao Funahashi, both of Iwaki, Japan

[73] Assignee: Kureha Kagaku Kogyo Kabushiki Kaisha, Tokyo, Japan

[22] Filed: Nov. 8, 1973

[21] Appl. No.: 413,906

[30] Foreign Application Priority Data

Nov. 10, 1972  Japan............................ 47-112656

[52] U.S. Cl................................ 423/242; 423/166
[51] Int. Cl.²........................................ C01B 17/00
[58] Field of Search........................... 423/242–244, 423/512, 166, 167, 555

[56] References Cited
UNITED STATES PATENTS

| | | | |
|---|---|---|---|
| 1,271,899 | 7/1918 | Howard et al. ..................... | 423/512 |
| 2,021,936 | 11/1935 | Johnstone ........................... | 423/242 |
| 2,926,999 | 3/1960 | Tarbutton et al. .................. | 423/242 |
| 3,556,722 | 1/1971 | Owaki ................................. | 423/555 |
| 3,775,532 | 11/1973 | Shak .................................... | 423/242 |

*Primary Examiner*—Oscar R. Vertiz
*Assistant Examiner*—Gregory A. Heller

[57] ABSTRACT

A method for effectively removing sulfur dioxide in the form of calcium sulfite from a combustion exhaust gas, comprising the steps of (1) feeding a portion of the combustion exhaust gas to a dilute sulfuric acid solution to produce sulfurous acid in the solution and oxidizing the resultant sulfurous acid with use of air or oxygen in the presence of an oxidizing catalyst to produce sulfuric acid; (2) feeding a residue of the combustion exhaust gas and the gas exhausted from the step (1) to an alkali sulfite aqueous solution to produce an alkali bisulfite aqueous solution; (3) mixing a major portion of the alkali bisulfite aqueous solution produced in the step (2) with slaked lime or limestone for reaction to give a calcium sulfite-containing reaction solution; (4) separating calcium sulfite from the reaction solution obtained in the step (3); and (5) circulating the filtrate of the step (4) to the step (2) and mixing a minor portion of the alkali bisulfite aqueous solution produced in the step (2) with sulfuric acid produced in the step (1) and with a portion of calcium sulfite separated in the step (4), thereby to convert an alkali sulfate, which is secondarily produced in the alkali bisulfite aqueous solution, into gypsum.

4 Claims, 1 Drawing Figure

METHOD FOR REMOVING SULFUR DIOXIDE FROM A COMBUSTION EXHAUST GAS

This invention relates to a method for removing sulfur dioxide in the form of calcium sulfite from a sulfur dioxide-containing combustion exhaust gas, and more particularly to a method for effectively removing sulfur dioxide in the form of calcium sulfite from a combustion exhaust gas, wherein the combustion exhaust gas is contacted with an alkali sulfite aqueous solution to produce an alkali bisulfite aqueous solution, and then slaked lime or limestone is introduced into the bisulfite aqueous solution for forming calcium sulfite, characterized by eliminating an alkali sulfate which is secondarily produced in the alkali bisulfite aqueous solution.

BACKGROUND OF THE INVENTION

Many methods for removing sulfur dioxide from a combustion exhaust gas have been heretofore proposed, including a dry method using various kinds of adsorbents, a wet method employing an alkali sulfite aqueous solution, etc. In the wet method using an alkali sulfite aqueous solution, for example, a combustion exhaust gas is introduced into the alkali sulfite aqueous solution for interacting sulfur dioxide contained in the combustion exhaust gas and the alkali sulfite to produce an alkali bisulfite, and the resultant alkali bisulfite is reacted with slaked lime or limestone to produce calcium sulfite, resulting in removal of sulfur dioxide in the form of calcium sulfite from the combustion exhaust gas. In this methods, when sodium sulfite is used as an alkali sulfite, the reactions occur as represented by the following formulae:

$$SO_2 + Na_2SO_3 + H_2O \rightarrow 2\ NaHSO_3 \quad (1)$$

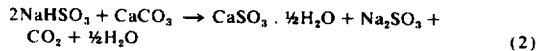

$$2NaHSO_3 + CaCO_3 \rightarrow CaSO_3 \cdot \tfrac{1}{2}H_2O + Na_2SO_3 + CO_2 + \tfrac{1}{2}H_2O \quad (2)$$

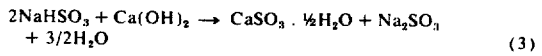

$$2NaHSO_3 + Ca(OH)_2 \rightarrow CaSO_3 \cdot \tfrac{1}{2}H_2O + Na_2SO_3 + 3/2H_2O \quad (3)$$

However, when the combustion exhaust gas is introduced into the alkali sulfite aqueous solution for reaction of sulfur dioxide with the alkali sulfite, a portion of the alkali sulfite is oxidized by means of oxygen, which is also contained in the combustion exhaust gas, thereby to produce an alkali sulfate. Accordingly, a reaction solution of an alkali bisulfite which is obtained by the interaction of sulfur dioxide and the alkali sulfite also contains the alkali sulfate as an undesirable by-product.

The alkali sulfate is accumulated in the alkali bisulfite aqueous solution in a large amount, an efficiency of absorption of sulfur dioxide in the alkali suflite aqueous solution is extremely lowered. Accordingly, it is essentially required to eliminate the produced alkali sulfate from the alkali bisulfite aqueous solution. In the prior methods, sulfuric acid and calcium sulfite are added, out of the reaction system, to the alkali bisulfite aqueous solution for converting the alkali sulfate into gypsum ($CaSO_4 \cdot 2H_2O$) in accordance with the following reaction formulae (wherein sodium sulfate is used as the alkali sulfate), thus removing the alkali sulfate in the form of gypsum from the reaction solution:

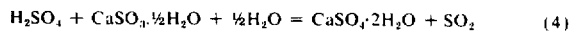

$$H_2SO_4 + CaSO_3 \cdot \tfrac{1}{2}H_2O + \tfrac{1}{2}H_2O = CaSO_4 \cdot 2H_2O + SO_2 \quad (4)$$

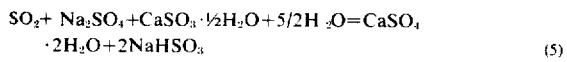

$$SO_2 + Na_2SO_4 + CaSO_3 \cdot \tfrac{1}{2}H_2O + 5/2H_2O = CaSO_4 \cdot 2H_2O + 2NaHSO_3 \quad (5)$$

However, the introduction of sulfuric acid and calcium sulfite out of the reaction system disadvantageously necessitates additional complicated operation.

SUMMARY OF THE INVENTION

It is therefore a primary object of the present invention to provide a wet method for effectively removing sulfur dioxide in the form of calcium sulfite from a sulfur-dioxide-containing combustion exhaust gas by eliminating an alkali sulfate, which is secondarily produced and accumulated in an alkali bisulfite aqueous solution, with use of sulfuric acid and calcium sulfite which are produced within the reaction system.

Other objects and advantages, and features of the present invention will become apparent from the following description.

In general, sulfur dioxide can be readily converted into sulfuric acid by having sulfur dioxide absorbed in a dilute sulfuric acid to produce a sulfurous acid solution, and feeding air or oxygen to the resultant sulfurous acid solution for oxidizing sulfurous acid ($H_2SO_3$) in the presence of an oxidizing catalyst. Accordingly, when a sulfur dioxide-containing combustion exhaust gas is treated in accordance with the above-mentioned method, sulfuric acid can be easily continuously produced with use of sulfur dioxide, i.e., a portion of the combustion exhaust gas is brought into contact with a dilute sulfuric acid solution for permitting sulfur dioxide to be absorbed in the solution to produce sulfurous acid in the solution, which is then oxidized by means of air or oxygen in the presence of an oxidizing catalyst, thus resulting in production of sulfuric acid.

While, a residue of sulfur dioxide-containing combustion exhaust gas is combined with a gas which is exhausted after absorption of the combustion exhaust gas in the dilute sulfuric acid solution, and the thus combined gas is introduced into an alkali sulfite aqueous solution to produce an alkali bisulfite in the form of an aqueous solution. Then, slaked lime or limestone is added to the alkali bisulfite aqueous solution to produce calcium sulfite. In this manner, sulfuric acid and calcium sulfite can be easily continuously produced within the reaction system, and can be used for removing the alkali sulfate, which is secondarily produced in the alkali bisulfite aqueous solution, without introducing, out of the reaction system, sulfuric acid and calcium sulfite into the solution. As a result, sulfur dioxide can be effectively removed in the form of calcium sulfite.

In accordance with the present invention, there is provided a method for removing sulfur dioxide in the form of calcium sulfite from a sulfur-dioxide-containing combustion exhaust gas, the method comprising the steps of (1) feeding a portion of the combustion exhaust gas to a dilute sulfuric acid solution to produce sulfurous acid in the solution, which is then oxidized by means of air or oxygen in the presence of an oxidizing catalyst to produce sulfuric acid; (2) feeding a residue of the combustion exhaust gas and the gas exhausted from the step (1) to an alkali sulfite aqueous solution to produce an alkali bisulfite aqueous solution; (3) mixing a major portion of the alkali bisulfite aqueous solution produced in the step (2) with slaked lime or limestone for reaction to give a reaction solution containing calcium sulfite; and (4) separating calcium sulfite from the reaction solution obtained in the step (3), the filtrate separated on the step (4) being circulated to the step (2) and a minor portion of the alkali bisulfite aqueous solution produced in the step (2) being mixed with sulfuric acid produced in the step (1) and with a portion of calcium sulfite separated in the step (4) thereby to convert an alkali sulfate, which is secondarily produced in the alkali bisulfite aqueous solution, into gypsum. Thus, it is unnecessary to introduce sulfuric acid and calcium sulfite out of the reaction system, so that the removal of sulfur dioxide can be effectively carried out.

BRIEF DESCRIPTION OF THE DRAWING

A sole FIGURE is a flow chart showing an embodiment of the present invention.

DETAILED DESCRIPTION OF THE INVENTION

Figure 1:
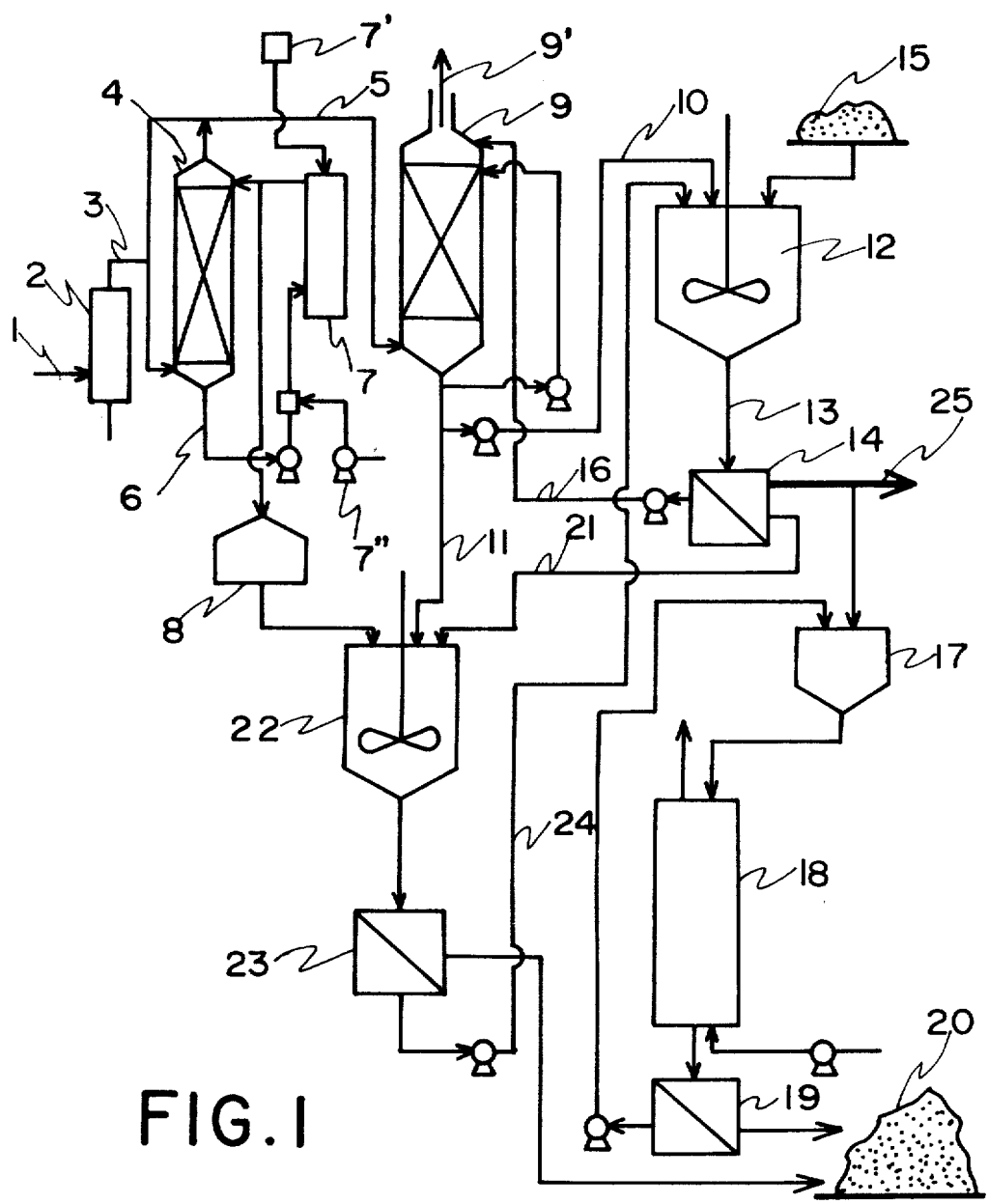

As described hereinbefore, in the present invention, a portion of the sulfur dioxide-containing combustion exhaust gas is contacted with or introduced into a dilute sulfuric acid solution for having sulfur dioxide absorbed in the dilute sulfuric acid solution and dissolving it in the form of sulfurous acid ($H_2SO_3$). Then, air or oxygen is blown or introduced into the sulfur dioxide-absorbing solution (i.e., sulfurous acid solution) for oxidizing sulfurous acid with air or oxygen in the presence of an oxidizing catalyst such as iron sulfate, manganese sulfate or the mixture thereof thereby to produce sulfuric acid. It will be noted that since sulfuric acid is employed only for converting the alkali sulfate, which is secondarily produced in the alkali bisulfite aqueous solution, into gypsum for removal, the production of sulfuric acid is required only in a small amount, e.g., it appears sufficient to oxidize or convert 5–20 percent (usually about 10 percent of sulfur dioxide contained in the total combustion exhaust gas used into sulfuric acid. When a portion of the sulfur dioxide-containing combustion exhaust gas is introduced into the dilute sulfuric acid solution for having sulfur dioxide absorbed in the solution, it is not required to raise a concentration of the dilute sulfuric acid to a high level since an efficiency of absorption of sulfur dioxide in the solution is lowered due to its strong acidity. That is, the concentration of the dilute sulfuric acid solution is desired to be within a range of 1–40 percent, preferably 4–15 percent.

The amount of the oxidizing catalyst is not critical, e.g., with iron sulfate, the concentration of the catalyst may be within a range of about 0.05 – about 0.5 percent in terms of iron ion.

In accordance with the present invention, a gas which is exhausted from the step of the production of sulfuric acid is combined with combustion exhaust gas except for that used for the production of sulfuric acid. The combined gas is introduced into the alkali sulfite aqueous solution for permitting sulfur dioxide, which is contained in the exhaust gas and the combustion exhaust gas, to be absorbed in the alkali sulfite aqueous solution for reaction thereby to produce an alkali bisulfite aqueous solution. In this case, a pH value of the resultant alkali bisulfite aqueous solution is desired to be within a range of 5.5–7.0. This is due to the following reasons; where an alkali bisulfite aqueous solution which has a pH value lower than 5.5 is produced, absorption efficiency of sulfur dioxide absorbed in the alkali sulfite aqueous solution is extremely reduced; and where an alkali bisulfite aqueous solution which has a pH value higher than 7.0 is produced, in the next step wherein the alkali bisulfite is reacted with slaked lime or limestone to produce the calcium sulfite, velocity of said reaction is remarkably reduced. Accordingly, the pH value of the alkali bisulfite aqueous solution should be maintained within a range of 5.5–7.0. To this end, for example, it is preferred to use the alkali sulfite aqueous solution having a concentration of 10–25 percent for having sulfur dioxide absorbed in the alkali sulfite aqueous solution to produce an alkali bisulfite aqueous solution which contains 3–15 wt % of the alkali bisulfite.

In the following step of the present invention, slaked lime or limestone is added to the alkali bisulfite aqueous solution for interacting the alkali bisulfite and slaked lime or limestone in accordance with the aforementioned reaction formulae (2) and (3), thereby to produce calcium sulfite. The thus produced calcium sulfite is separated from the reaction solution and the resulting filtrate which is the alkali sulfite aqueous solution ($Na_2SO_3 + H_2O$) is circulated for use as a sulfur dioxide-absorbing solution. It will be noted that the separated calcium sulfite may be formed into a slurry for easily oxidizing the sulfite by means of air or oxygen to produce gypsum, if necessary.

In the present invention, furthermore, sulfuric acid, which is obtained in the first step of the present invention as described hereinbefore, a portion of the alkali bisulfite aqueous solution, and a portion of the calcium sulfite are mixed together for converting an alkali sulfate, which is contained in the alkali bisulfite aqueous solution, into gypsum in accordance with the aforementioned reaction formulae (4) and (5), thus the alkali sulfate being removed in the form of gypsum by filtration. In this connection, the resulting filtrate is an alkali bisulfite aqueous solution ($NaHSO_3 + H_2O$), so that it can be recirculated to the step for introducing slaked lime or limestone into the alkali bisulfite aqueous solution.

The present invention will be described in more detail with reference to the accompanying drawing. In the drawing, there is indicated at 1 a pipe for feeding a sulfur dioxide-containing combustion exhaust gas; at 2 a dust-removing apparatus; at 3 a branched pipe for feeding the combustion exhaust gas which is charged from the dust-removing apparatus 2; at 4 a first absorption tower of the combustion exhaust gas; at 7 an oxidizing tower for oxidizing a sulfur dioxide-absorbing solution which is obtained in the first absorption tower 4; at 7' a tank for storing an oxidizing catalyst to be fed to the oxidizing tower 7; at 7'' a blower for feeding air or oxygen to the oxidizing tower 7; at 5 a pipe for feeding to a second absorption tower 9 a combined gas of a residue of the combustion exhaust gas except for that charged into the first absorption tower 4 from the dust-removing apparatus 2 through the branched pipe 3 and of an exhaust gas which is charged from the first absorption tower 4; at 9 a second absorption tower for contacting the combined gas with an alkali sulfite aqueous solution to produce an alkali bisulfite aqueous solution; at 9' a harmless desulfurized exhaust gas which is exhausted from the second absorption tower 9; at 10 a pipe for feeding the alkali bisulfite aqueous solution, which is produced in the second absorption tower 9, to a double decomposition vessel 12; at 12 a double decomposition vessel for interacting the alkali bisulfite aqueous solution, which is fed through the pipe 10, and slaked lime or limestone 15 to produce a calcium sulfite-containing reaction solution. Further, there is designated at 8 a sulfuric acid reservoir for storing sulfuric acid which is produced by feeding a sulfur dioxide-absorbing solution (or a sulfurous acid solution) to the oxidizing tower 7 and the first absorption tower 4 through the pipe 6; at 14 a filter and separator for separating calcium sulfite from a reaction solution which formed in the double decomposition vessel 12 and fed through a pipe 13; at 25 a tube for withdrawing calcium sulfite separated in the filter and separator 14; at 16 a pipe for feeding to the second absorption tower 9 a filtrate ($Na_2SO_3 + H_2O$) which is obtained by separation of calcium sulfite in the filter and separator; at 22 a vessel for converting an alkali sulfate, which is secondarily produced in the alkali bisulfite aqueous solution, into gypsum by mixing a portion of calcium sulfite, which is separated in the filter and separator 14, with sulfuric acid charged from the reservoir 8, and with a portion of the alkali bisulfite aqueous solution, which is produced in the second absorption tower 9 and fed through the pipe 11; at 23 a filter and separator for separating gypsum, which is formed in the vessel 22, from the reaction solution; and at 24 a pipe for feeding to the double decomposition vessel 12 a filtrate which is resulted from separation of gypsum in the filter and separator 23. Additionally, there is indicated at 17 a slurry-producing vessel wherein calcium sulfite which is obtained by separating it in the filter and separator 14 is formed into a slurry so as to easily produce gypsum; at 18 an oxidizing tower for oxidizing the calcium sulfite slurry, which is obtained in the slurry-producing vessel 17, in the presence of air or oxygen; at 19 a filter and separator for separating gypsum, which is obtained in the oxidizing tower 18, from reaction solution; and at 20 produced gypsum yielded in the filter and separators 19 and 23.

In operation, the sulfur dioxide-containing combustion exhaust gas is introduced into the dust-removing apparatus 2 through the pipe 1 for removing dust, a portion of the resulting combustion exhaust gas is fed to the first absorption tower 4 through the branched pipe 3 to have the sulfur dioxide component absorbed in a dilute sulfuric acid solution of the tower 4, resulting in production of a sulfurous acid solution. The sulfurous acid solution is passed to the oxidizing tower 7, to which an oxidizing catalyst is fed from the tank 7' and to which air or oxygen is also fed from the blower 7'', to produce sulfuric acid. In order to obtain sulfuric acid having a predetermined concentration, the sulfurous acid solution or absorption solution is circulated through the first absorption tower 4 and the oxidizing tower 7, which are communicated with the pipe 6. The resultant sulfuric acid is stored in the reservoir 8. While, a residue of the combustion exhaust gas except for that fed to the first absorption tower 4 is combined with a gas which is exhausted from the first absorption tower 4. The combined gas is fed to the second absorption tower 9 through the pipe 5 for contact with an alkali sulfite aqueous solution having a concentration of 10-25 percent to obtain an alkali bisulfite aqueous solution having a pH value of 6.0-7.0. The desulfurized harmless gas is released into the air from the top of the second absorption tower 9. A major portion of the resultant alkali bisulfite aqueous solution is passed to the double decomposition vessel 12 through the pipe 10. In the vessel 12, slaked lime or limestone 15 is added to the bisulfite solution for interacting slaked lime or limestone 15 and the alkali bisulfite to produce calcium sulfite. The resultant reaction solution is then introduced through the pipe 13 into the filter and separator 14 wherein calcium sulfite is separated from the reaction solution and is withdrawn through pipe 25. The resultant filtrate is recirculated to the second absorption tower 9 through pipe 16.

Sulfuric acid produced and stored in the reservoir 8 is introduced into the vessel 22 which a portion of the alkali bisulfite aqueous solution, which is produced in the second absorption tower 9, is also introduced through the pipe 11. Furthermore, a portion of calcium sulfite separated in the filter and separator 14 is fed to the vessel 22 through the pipe 21. In this manner, the alkali sulfate contained in the alkali bisulfite aqueous solution is converted into gypsum, which is then separated from the reaction solution by means of the filter and separator 23. The resultant filtrate is circulated to the double decomposition vessel 12 through the pipe 24. While, calcium sulfite which is obtained by separation in the filter and separator 14 may introduced into the slurry-producing vessel 17, if necessry, for mixing with water to form a slurry. The slurry is passed to the oxidizing tower 18 wherein calcium sulfite is oxidized in the presence of air or oxygen to produce gypsum, which is separated from the solution by means of the filter and separator 19 to obtain produced gypsum 20.

As will be apparent from the foregoing, in accordance with the present invention, the alkali sulfate which is secondarily produced in the reaction system can be removed without introducing sulfuric acid and calcium sulfite out of the reaction system. This is extremely advantageous for the treatment of a combustion exhaust gas with use of an alkali sulfite aqueous solution.

The following example will further illustrate the present invention, but the invention is not restricted to the example.

EXAMPLE

A gas which was exhausted from an electric power plant and which contained 1750 ppm of $SO_2$ and had a temperature of about 150°C was introduced into the dust-removing apparatus 2 through the pipe 3, as shown in the accompanying drawing, at a flow rate of 5200 $Nm^3$/hr. Then, a portion, i.e., 1700 $Nm^3$/hr, of the gas was passed to the first absorption tower 4 through the branched pipe 3. In the tower 4, the passed gas was contacted with 1172 kg/hr of a 6% sulfuric acid solution containing 0.1% of iron sulfate to collect 70% of $SO_2$. In this connection, 44 kg/hr of water evaporated and 1135 kg/hr of a 7% sulfuric acid solution having a temperature of 50°-70°C were obtained, respectively, in the tower 4.

While, a residue (3500 $Nm^3$/hr) of the gas, a gas exhausted from the tower 4, and 44 kg/hr of evaporated water were combined together and fed to the second absorption tower 9 wherein the combined gas was introduced into 1000 kg of an absorption solution containing 0.85% of $NaHSO_3$, 13% of $Na_2SO_3$ and 4.8% of $Na_2SO_4$ for reaction to have $SO_2$ absorbed in the solution at an absorption rate of 98.6% and to produce 900 kg/hr of a reaction solution containing 8.5% of $NaHSO_3$ 9.8% of $Na_2SO_3$ and 5.3% of $Na_2SO_4$ and having a pH value of 6.24. In the second absorption tower 9, water was evaporated in an amount of 125 kg/hr.

Then, 90 kg of the reaction solution was withdrawn from the tower 9 and fed to the vessel 22. Furthermore, 15.09 kg/hr of $CaSO_3.\frac{1}{2}H_2O$, which was produced in the double decomposition vessel 12 and separated in the separator 14, and 131 kg/hr of the 7% sulfuric acid solution produced in the tower 4 were also fed to the vessel 12 for reaction. Then, the resultant product was filtered and separated from the reaction solution to obtain 25.3 kg/hr of crystalline gypsum (93% of $CaSO_4.2H_2O$) having an average particle size of about 100 $\mu$. Furthermore, there was obtained as a filtrate 247 kg/hr of a solution containing 11% of $NaHSO_3$ and 0.68% of $Na_2SO_4$. The filtrate was fed to the double decomposition vessel 12 for combination with 810 kg/hr of alkali besulfite aqueous solution obtained in the second absorption tower 9. Then 48.5 kg/hr of powdered calcium carbonate (having a purity of 98 percent was added to the combined solution for reaction to give 54 kg/hr of $CaSO_3.\frac{1}{2}H_2O$. 38.91 kg/hr of the $CaSO_3.\frac{1}{2}H_2O$ was fed to the oxidizing tower 18 oxidizing it by means of air to obtain a crystalline product. The product was separated by means of the filter and separator 19 to obtain 56 kg/hr of crystalline gypsum (93% of $CaSO_4.2H_2O$) having an particle size of about 100 $\mu$.

While, 1003 kg/hr of a filtrate, which was separated in the separator 14 from the reaction solution produced in the double decomposition tower 12, contained 0.96% of $NaHSO_3$, 13.11% of $Na_2SO_3$ and 4.44% of $Na_2SO_4$ and accordingly circulated to the second absorption tower 9 for having $SO_2$ absorbed therein.

Thus, the removal of sulfur dioxide from the sulfur dioxide-containing exhaust gas could be suitably carried out without introducing sulfuric acid and calcium sulfite out of the reaction system. That is, sulfuric acid and the calcium sulfite which were essentially required for removing the undesirable by-product, i.e., sodium sulfate, could be continuously produced within the reaction system as described hereinbefore.

What is claimed is:

1. A method for removing sulfur dioxide in the form of calcium sulfite from a sulfur dioxide-containing combustion exhaust gas, comprising the steps of:
    1. feeding a portion of the combustion exhaust gas to a sulfuric acid solution to produce sulfurous acid in the solution and a gas exhaust and then oxidizing the sulfurous acid with air or oxygen in the presence of an oxidizing catalyst to produce sulfuric acid;
    2. feeding the remaining portion of the combustion exhaust gas and the gas exhausted from step (1) to an aqueous solution of alkali sulfite to produce an aqueous solution of alkali bisulfite and alkali sulfate;
    3. mixing a major portion of the aqueous solution of alkali bisulfite produced in step (2) with slaked lime or limestone for reaction to give a reaction solution containing calcium sulfite; and
    4. separating calcium sulfite from the reaction solution obtained in step (3), the filtrate separated in step (4) being circulated to step (2), and the minor portion of the aqueous solution of alkali bisulfite produced in step (2) being mixed with sulfuric acid produced in step (1) and with a portion of calcium sulfite separated in step (4) thereby to convert the alkali sulfate, which is secondarily produced in the aqueous solution of alkali bisulfite, into gypsum.

2. The method according to claim 1 wherein said calcium sulfite separated in step (4) is oxidized by means of air or oxygen to produce gypsum.

3. The method according to claim 1 wherein the pH of the aqueous solution of alkali bisulfite produced in step (2) is within the range of 5.5–7.0.

4. The method according to claim 1 wherein the concentration of said dilute sulfuric acid solution is within the range of 1 – 40 percent.

* * * * *